(12) United States Patent
Hellstrom et al.

(10) Patent No.: US 9,429,096 B2
(45) Date of Patent: Aug. 30, 2016

(54) PREDICTIVE MODELING AND REDUCING CYCLIC VARIABILITY IN AUTOIGNITION ENGINES

(71) Applicant: Robert Bosch GmbH, Stuttgart (DE)

(72) Inventors: Erik Hellstrom, Ann Arbor, MI (US); Anna Stefanopoulou, Ann Arbor, MI (US); Li Jiang, Ann Arbor, MI (US); Jacob Larimore, Ann Arbor, MI (US)

(73) Assignees: Robert Bosch GmbH, Stuttgart (DE); The Regents of the University of Wisconsin, Ann Arbor, MI (US)

( * ) Notice: Subject to any disclaimer, the term of this patent is extended or adjusted under 35 U.S.C. 154(b) by 1018 days.

(21) Appl. No.: 13/621,539

(22) Filed: Sep. 17, 2012

(65) Prior Publication Data

US 2013/0073185 A1    Mar. 21, 2013

Related U.S. Application Data

(60) Provisional application No. 61/535,122, filed on Sep. 15, 2011, provisional application No. 61/543,544, filed on Oct. 5, 2011.

(51) Int. Cl.
*F02M 7/00* (2006.01)
*F02D 41/30* (2006.01)
*F02D 35/02* (2006.01)
(Continued)

(52) U.S. Cl.
CPC ....... *F02D 41/3035* (2013.01); *F02D 13/0265* (2013.01); *F02D 35/024* (2013.01); *F02D 35/025* (2013.01); *F02D 35/026* (2013.01); *F02D 35/028* (2013.01); *F02D 41/40* (2013.01); *F02B 1/12* (2013.01); *F02D 2041/1432* (2013.01); *F02D 2200/0616* (2013.01);
(Continued)

(58) Field of Classification Search
CPC ............. F02D 41/1498; F02D 35/023; F02D 35/024; F02D 35/021; F02D 35/027; F02D 35/028; F02D 35/02; F02D 2200/1015; F02D 35/025; F02D 41/0062; F02D 35/026; G01M 15/08; G01L 23/221; G01L 23/10
USPC ................................ 123/435, 436; 73/114.17
See application file for complete search history.

(56) References Cited

U.S. PATENT DOCUMENTS

| 4,344,140 A * | 8/1982 | Leung ................. F02D 41/1498 123/435 |
| 4,843,556 A * | 6/1989 | Wakeman ........... F02D 41/1408 700/38 |

(Continued)

OTHER PUBLICATIONS

Daw et al., "Observing and modeling nonlinear dynamics in an internal combustion engine," Phys. Rev. E, 57(3): 2811-2819, 1998.
(Continued)

*Primary Examiner* — Thomas Moulis
(74) *Attorney, Agent, or Firm* — Michael Best & Friedrich LLP (57) ABSTRACT

Methods and systems are provided for controlling a vehicle engine to reduce cycle-to-cycle combustion variation. A predictive model is applied to predict cycle-to-cycle combustion behavior of an engine based on observed engine performance variables. Conditions are identified, based on the predicted cycle-to-cycle combustion behavior, that indicate high cycle-to-cycle combustion variation. Corrective measures are then applied to prevent the predicted high cycle-to-cycle combustion variation.

19 Claims, 6 Drawing Sheets

(51) Int. Cl.
*F02D 41/40* (2006.01)
*F02D 13/02* (2006.01)
*F02B 1/12* (2006.01)
*F02D 41/14* (2006.01)

(52) U.S. Cl.
CPC .............. *Y02T10/128* (2013.01); *Y02T 10/18* (2013.01); *Y02T 10/44* (2013.01)

(56) References Cited

U.S. PATENT DOCUMENTS

| | | | | |
|---|---|---|---|---|
| 4,928,653 | A * | 5/1990 | Ohkubo | F02D 35/023 123/435 |
| 5,093,792 | A * | 3/1992 | Taki | F02D 35/023 701/111 |
| 5,105,657 | A * | 4/1992 | Nakaniwa | G01M 15/11 73/114.04 |
| 5,141,246 | A * | 8/1992 | Nakaniwa | B60G 17/0185 280/124.1 |
| 5,495,415 | A * | 2/1996 | Ribbens | G01M 15/11 123/436 |
| 5,642,713 | A * | 7/1997 | Schmitz | F02D 35/02 123/435 |
| 5,921,221 | A | 7/1999 | Davis, Jr. et al. | |
| 6,085,143 | A | 7/2000 | Przymusinski et al. | |
| 6,272,426 | B1 * | 8/2001 | Tascillo | F02D 35/023 123/406.42 |
| 6,276,334 | B1 | 8/2001 | Flynn et al. | |
| 6,286,482 | B1 * | 9/2001 | Flynn | F02B 1/12 123/25 C |
| 6,336,436 | B1 * | 1/2002 | Miyakubo | F02B 11/02 123/295 |
| 6,553,949 | B1 * | 4/2003 | Kolmanovsky | F02B 75/045 123/406.21 |
| 6,675,639 | B1 * | 1/2004 | Schricker | G01M 15/102 73/114.01 |
| 6,718,957 | B2 * | 4/2004 | Kakuho | F02D 13/0219 123/568.14 |
| 6,748,928 | B2 | 6/2004 | Shingole | |
| 6,801,847 | B2 | 10/2004 | Jaliwala et al. | |
| 6,840,235 | B2 * | 1/2005 | Koseki | F01L 1/20 123/568.14 |
| 6,876,919 | B2 | 4/2005 | James et al. | |
| 7,021,286 | B2 * | 4/2006 | Yoshino | F02D 35/025 123/406.29 |
| 7,021,287 | B2 * | 4/2006 | Zhu | F01N 3/2006 123/406.22 |
| 7,076,360 | B1 * | 7/2006 | Ma | F02D 15/04 701/103 |
| 7,167,789 | B1 | 1/2007 | Froloff et al. | |
| 7,184,877 | B1 | 2/2007 | de Ojeda | |
| 7,212,909 | B2 * | 5/2007 | Yoshino | F02D 35/028 123/406.37 |
| 7,222,606 | B2 * | 5/2007 | Yoshino | F02P 5/152 123/406.37 |
| 7,254,475 | B1 * | 8/2007 | Grai | F02D 35/021 701/111 |
| 7,357,103 | B2 | 4/2008 | Koopmans | |
| 7,370,616 | B2 | 5/2008 | Kuo et al. | |
| 7,431,011 | B2 | 10/2008 | Wagner et al. | |
| 7,461,545 | B2 * | 12/2008 | Gardiner | G01M 15/048 73/114.02 |
| 7,467,040 | B2 | 12/2008 | Ker et al. | |
| 7,469,181 | B2 | 12/2008 | Duffy et al. | |
| 7,810,478 | B2 | 10/2010 | Petridis et al. | |
| 7,899,601 | B2 | 3/2011 | Yun et al. | |
| 8,127,750 | B2 * | 3/2012 | Klein | F02D 19/081 123/3 |
| 8,190,307 | B2 | 5/2012 | Omar | |
| 8,826,884 | B2 * | 9/2014 | Kang | F02D 35/023 123/305 |
| 9,322,382 | B2 * | 4/2016 | Garagnani | F02P 17/12 |
| 2008/0178843 | A1 | 7/2008 | Duffy et al. | |
| 2009/0173296 | A1 * | 7/2009 | O'Neill | F01L 1/143 123/90.16 |
| 2009/0229563 | A1 | 9/2009 | Rayl et al. | |
| 2009/0274465 | A1 | 11/2009 | Bandyopadhyay | |
| 2009/0306866 | A1 | 12/2009 | Malikopoulos | |
| 2010/0031924 | A1 * | 2/2010 | Sun | F02B 1/12 123/435 |
| 2010/0162991 | A1 | 7/2010 | Ramappan et al. | |
| 2010/0275860 | A1 | 11/2010 | Subbotin et al. | |
| 2011/0270505 | A1 | 11/2011 | Chaturvedi et al. | |
| 2012/0253634 | A1 | 10/2012 | Jiang et al. | |

OTHER PUBLICATIONS

Daw et al., "Modeling cyclic variability in spark-assisted HCCI," Journal of Engineering for Gas Turbines and Power, 130(5): 052801-1-052801-6, 2008.
Davis et al., "Controlling cyclic combustion variations in lean-fueled spark-ignition engines," In SAE World Congress, Detroit, MI, USA, SAE 2001-01-0257.
Koopmans et al., "Demonstrating a SI-HCCI-SI mode change on a Volvo 5-cylinder electronic valve control engine," In SAE World Congress, Detroit, MI, USA, 2003, SAE 2003-01-0753.
Wagner et al., "On the nature of cyclic dispersion in spark assisted HCCI combustion," In SAE World Congress, Detroit, MI, USA, 2006, SAE 2006-01-0418.
Hellstrom et al., "Modeling cyclic variability in lean controlled-autoignition engines," Submitted to 50th IEEE Conference on Decision and Control, Dec. 12-15, 2011, Orlando Florida.
Hellstrom et al. "Understanding the dynamic evolution of cyclic variability at the operating limits of HCCI engines with negative valve overlap," To be Submitted to 2012 SAE World Congress, Apr. 23-26, Detroit Michigan.
Larimore et al., "Experiments and Analysis of High Cyclic Variability at the Operational Limits of Spark-Assisted HCCI Combustion," Draft compiled Aug. 31, 2011.
Hellstrom et al., "Quantifying cyclic variability in a multi-cylinder HCCI engine with high residuals," ASME 2012 Internal Combustion Engine Division Spring Technical Conference, Torino, Piemonte, Italy, May 6-9, 2012.
U.S. Appl. No. 13/621,527, filed Sep. 17, 2012.
U.S. Appl. No. 13/621,433, filed Sep. 17, 2012.
U.S. Appl. No. 13/621,425, filed Sep. 17, 2012.
United States Patent Office Action for U.S. Appl. No. 13/621,527 dated Dec. 5, 2014 (11 pages).
Hellstrom, E. and Stefanopoulou, A. G., "Modeling cyclic dispersion in autoignition combustion," In Proceedings of the 50th IEEE Conference on Decision and Control, Dec. 12-15, 2011, pp. 6834-6839, Orlando, FL, USA.
Chiang, C. J., Stefanopoulou, A. G., and Jankovic, M., "Nonlinear observer-based control of load transitions in homogeneous charge compression ignition engines," IEEE Transactions on Control Systems Technology, May 2007, pp. 438-448, 15(3).
Chiang, C. J. and Stefanopoulou, A. G., "Stability analysis in homogeneous charge compression ignition (hcci) engines with high dilution," IEEE Transactions on Control Systems Technology, Mar. 2007, pp. 209-219, 15(2).
Chiang, C. J. and Stefanopoulou, A. G., "Control of thermal ignition in gasoline engines," In Proceedings of the American Control Conference, Jun. 2005, pp. 3847-3852, vol. 6.
Chiang, C. J. and Stefanopoulou, A. G., "Steady-state multiplicity and stability of thermal equilibria in homogeneous charge compression ignition (hcci) engines," In Proceedings of the 43rd IEEE Conference on Decision and Control, Dec. 2004, pp. 1676-1681, vol. 2.
Rausen, D. J., Stefanopoulou, A. G., Kang, J. M., Eng, J. A., and Kuo, T. W., "A mean-value model for control of homogeneous charge compression ignition (hcci) engines," Transactions of the ASME, Journal of Dynamic Systems, Measurement and Control, Sep. 2005, pp. 355-362, 3(3).
Rausen, D. J., Stefanopoulou, A. G., Kang, J. M., Eng, J. A., and Kuo, T. W., "A mean-value model for control of homogeneous charge compression ignition (hcci) engines," In Proceedings of the American Control Conference, Jul. 2004, pp. 125-131, vol. 1.

(56) References Cited

OTHER PUBLICATIONS

Daw, C. S., Kennel, M. B., Finney, C. E. A., and Connolly, F. T., "Observing and modeling nonlinear dynamics in internal an internal combustion engine," Phys. Rev. E, 1998, pp. 2811-2819, vol. 57, No. 3.

Davis, L. I., Jr., Feldkamp, L. A., Hoard, J. W., Yuan, F., Connolly, F. T., Daw, C. S., and Green, J. B., Jr., "Controlling cyclic combustion variations in lean-fueled spark-ignition engines," In SAE World Congress, 2001, SAE 2001-01-0257, 9 pages.

United States Patent Office Notice of Allowance for U.S. Appl. No. 13/621,527 dated Aug. 27, 2015 (9 pages).

* cited by examiner

PREDICTIVE MODELING AND REDUCING CYCLIC VARIABILITY IN AUTOIGNITION ENGINES

CROSS-REFERENCE TO RELATED APPLICATIONS

This application claims priority to U.S. Provisional Application No. 61/535,122, filed Sep. 15, 2011, titled "METHOD FOR MODELING CYCLIC VARIABILITY IN LEAN CONTROLLED-AUTOIGNITION ENGINES" and U.S. Provisional Application No. 61/543,544, filed Oct. 5, 2011, titled "FUELING STRATEGIES FOR CONTROLLED-AUTOIGNITION ENGINES," the entirety of both of which are incorporated herein by reference.

STATEMENT REGARDING FEDERALLY SPONSORED RESEARCH OR DEVELOPMENT

This invention was made with Government support under grant No. DE-EE0003533 awarded by the Department of Energy. The Government has certain rights in this invention.

BACKGROUND

The present invention relates to systems for controlling and optimizing the operation of an internal combustion engine. In particular, the present invention relates to methods of improving operation of an internal combustion engine operating in a controlled autoignition (or HCCI) combustion mode.

SUMMARY

In one embodiment, the invention provides a method of controlling a vehicle engine to reduce cycle-to-cycle combustion variation. A predictive model is applied to predict cycle-to-cycle combustion behaviour of an engine based on observed engine performance variables. Conditions are identified, based on the predicted cycle-to-cycle combustion behaviour, that indicate high cycle-to-cycle combustion variation. Corrective measures are then applied to prevent the predicted high cycle-to-cycle combustion variation.

In some embodiments, the predictive model is applied under engine operating conditions that are identified as unstable for HCCI or autoignition combustion modes. In some embodiments, the predictive model is applied when the engine is transitioning from one combustion mode to another—such as, for example, transitioning from spark ignition to HCCI.

In another embodiment, the invention provides a method of controlling a vehicle engine to reduce cycle-to-cycle combustion variation. A set of one or more engine operating conditions is determined. The set of engine operating conditions is compared to a set of defined operating regions. The engine is operated in a spark ignition mode when the set of one or more engine operating conditions are within a first defined operating region. The engine is operated in a homogeneous charge compression ignition (HCCI) mode when the set of one or more engine operating conditions are within a second defined operating region. When transitioning from the spark ignition mode to the HCCI mode, a predictive model is applied to predict at least one of (1) a combustion phasing and (2) a mean effective pressure value of an engine cylinder for each of a plurality of future combustion cycles based, at least in part, on a determined cylinder temperature and a determined amount of unburned fuel remaining in a cylinder after a current combustion cycle is complete. Variations in the combustion phasing or the predicted mean effective pressure values for the cylinder that indicate high cycle-to-cycle variation are identified. Fuel injection quantity and/or timing are adjusted for a subsequent combustion cycle to prevent the predicted high cycle-to-cycle combustion variation.

In yet another embodiment, the invention provides a method of controlling a vehicle engine to reduce cycle-to-cycle combustion variation. A set of one or more engine operating conditions is determined. The set of engine operating conditions is compared to a set of defined operating regions. If the engine operating conditions are within a first defined operating region, it is determined that the engine is operating in a stable HCCI region where HCCI combustion can be achieved with little risk of high cycle-to-cycle combustion variation. However, if the engine operating conditions are within a second defined operating region, it is determined that the engine is operating in an unstable HCCI region. Under these conditions, high cycle-to-cycle combustion variation is more likely when using HCCI combustion. When operating in the unstable HCCI region, a predictive model is applied to predict at least one of (1) a combustion phasing and (2) a mean effective pressure value of an engine cylinder for each of a plurality of future combustion cycles based, at least in part, on a determined cylinder temperature and a determined amount of unburned fuel remaining in a cylinder after a current combustion cycle is complete. Variations in the combustion phasing or the predicted mean effective pressure values for the cylinder that indicate high cycle-to-cycle variation are identified. Fuel injection quantity and/or timing are adjusted for a subsequent combustion cycle to prevent the predicted high cycle-to-cycle combustion variation.

Other aspects of the invention will become apparent by consideration of the detailed description and accompanying drawings.

DETAILED DESCRIPTION

Figure 1:
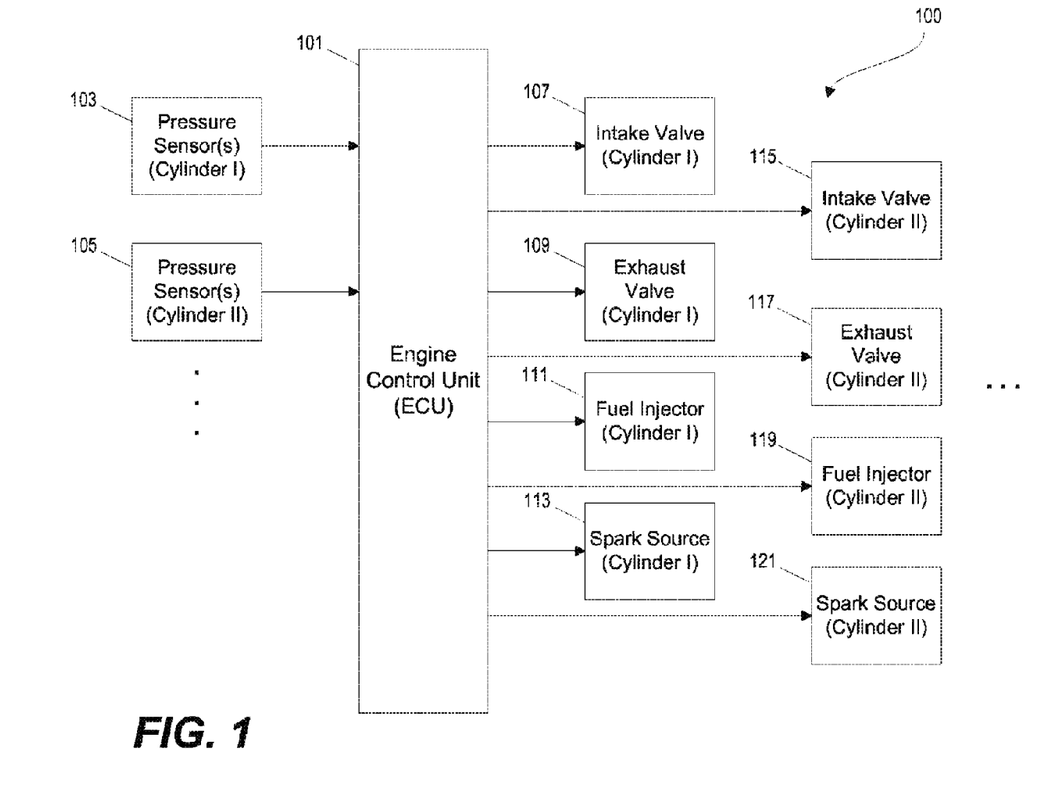
FIG. 1 is a block diagram of an engine control system according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIG. 1 illustrates a system 100 for controlling the operation of an internal combustion engine. As described in further detail below, the system is capable of operating the engine in various combustion modes including, for example, spark ignition, homogeneous charge compression ignition (HCCI), and spark-assisted compression ignition (SACI). The system includes an engine control unit 101 that includes a processor and memory. The memory stores instructions that are executed by the processor to cause the engine control unit 101 to perform various functional operations. The engine control unit 101 receives inputs from various sensors including one or more pressures sensors associated with each cylinder of the internal combustion engine 103, 105. The system 100 can also include other sensors that provide information regarding the status of the engine to the engine control unit 101 such as, for example, temperature sensors for the engine as a whole and temperature sensors associate with each individual cylinder.

Based on the combustion mode being implemented and, in some cases, the inputs received from the various engine sensors, the engine control unit 101 controls the operation of the engine by providing control signals to a plurality of actuators. For example, as illustrated in FIG. 1, the engine control unit 101 can control the intake valve 107, an exhaust valve 109, a fuel injector 111, and a spark source 113 in a specific engine cylinder. The engine control unit can also control the operation of an intake valve 115, exhaust valve 117, fuel injector 119, and spark source 121 for other cylinders in the engine.

Figure 2:
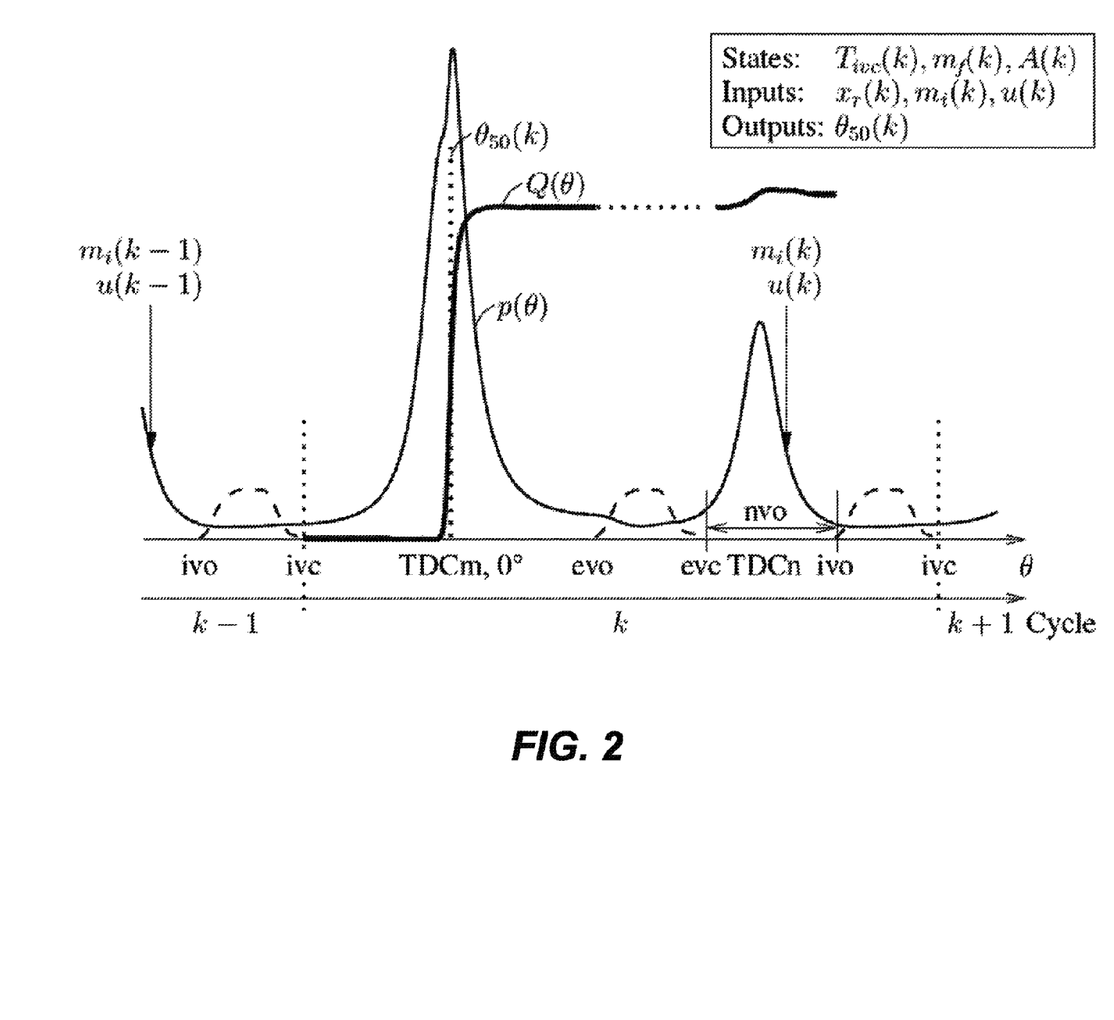
FIG. 2 is a graph of engine pressures and temperatures as a function of time during HCCI combustion.

FIG. 2 illustrates in further detail the operation of an engine during controlled autoignition—in particular, during an HCCI combustion mode. The lighter line indicates the pressure $p(\theta)$ in the engine cylinder as a function of time. The heavier line indicates the heat release $Q(\theta)$ in the engine cylinder. The illustrated combustion mode used negative valve overlap (NVO) to achieve HCCI combustion. In other words, there are two periods of time during each combustion cycle when both the exhaust valve and the intake valve are closed causing increases in the pressure inside the cylinder.

In the illustrated example, the intake valve is closed at ivc and the pressure begins to rise. The closing of the intake valve is timed to correspond with the compression of the gas in the cylinder by an engine piston. As the pressure increases, the fuel inside the engine combusts causing an increase in the heat release $Q(\theta)$ exhibited in the engine cylinder. The pressure decreases as the engine piston is forced downward and the exhaust valve is opened at evo.

When the exhaust valve is closed at evc, the pressure in the engine cylinder again begins to rise. It is during this period that a fuel mass $m_f(k)$ is injected into the engine cylinder. After a period of time, the intake valve is opened at ivo and closed again at ivc thereby beginning the next combustion cycle (k+1). FIG. 2 also illustrates the timing of the fuel injection during the previous combustion cycle at $m_f(k-1)$.

The engine system described above operates in one of a variety of combustion modes depending upon the operating conditions of the engine (e.g., engine torque, engine speed, etc.). If the engine is operating under conditions where HCCI combustion can be effectively applied, the engine control unit 101 operates the engine according to an HCCI combustion mode. However, in some operating conditions where HCCI combustion cannot be effectively applied, the engine control unit 101 will revert to standard spark ignition. This is because, without a spark to control the exact timing of ignition, the engine can exhibit high cycle-to-cycle combustion variation.

Figure 3A:
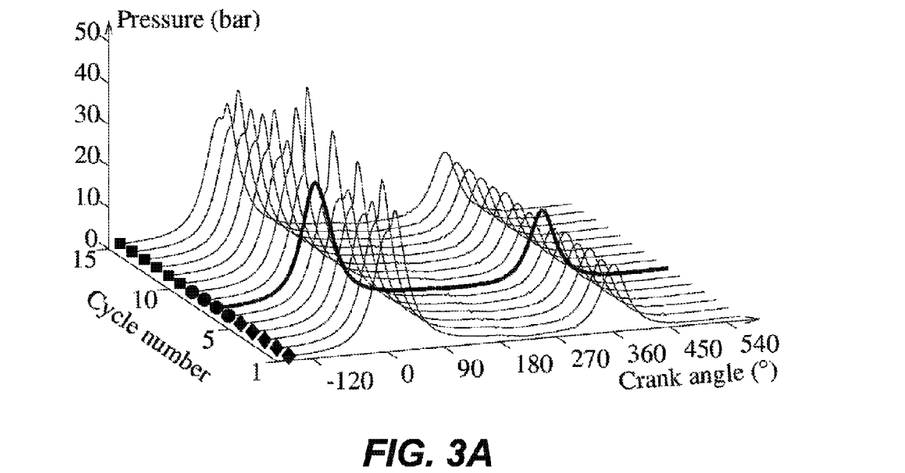
FIG. 3A is a graph of engine pressure as a function of crank angle for a plurality of combustion cycles during HCCI combustion.

FIG. 3A illustrates the pressure within the engine as a function of crank angle (or time) during HCCI operation. As illustrated by the heavier dark line, the pressure exhibited during cylinder compression in combustion cycle 5 is noticeably lower than the pressure exhibited at the same crank angle during other combustion cycles. Furthermore, the pressure in the cylinder at the time that fuel is injected is noticeably higher during combustion cycle 5. This is due in part to failure of the engine cylinder to ignite and burn all of the fuel mass present inside the engine cylinder during the combustion cycle. The amount of unburned fuel affects the performance of the engine and causes high cycle-to-cycle combustion variation.

Figure 3B:
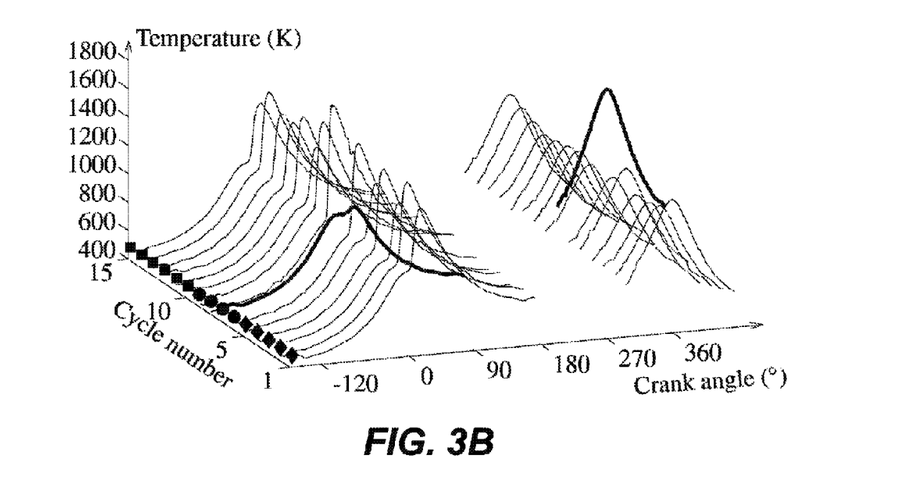
FIG. 3B is a graph of engine temperature as a function of crank angle for a plurality of combustion cycles during HCCI combustion.

As illustrated in FIG. 3B, temperature is also related to combustion variability in an engine cylinder. During the same combustion cycle 5, the temperature in the engine cylinder was significantly lower at the point of ignition. Subsequently, the temperature was much higher when the fuel for the next combustion cycle was injected.

Figure 3C:
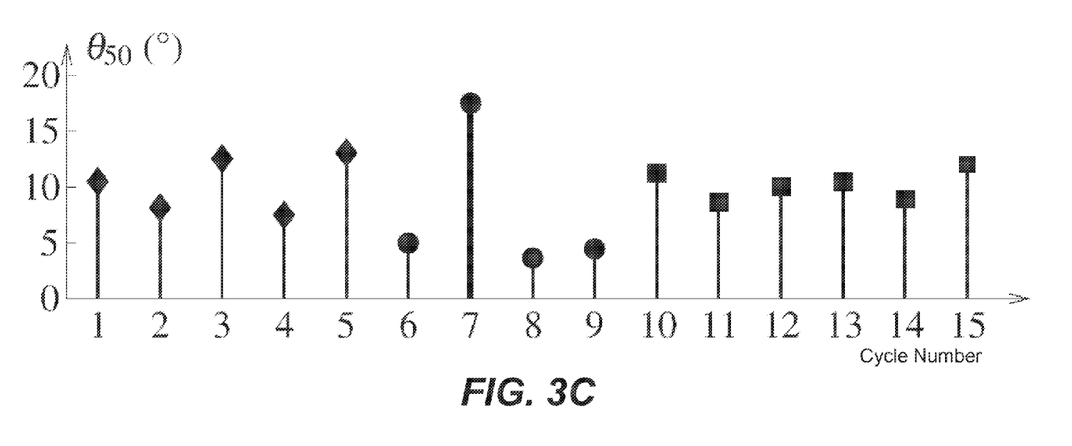
FIG. 3C is a graph illustrating the combustion phasing of an engine for each of a plurality of combustion cycles during HCCI combustion.
Figure 3D:
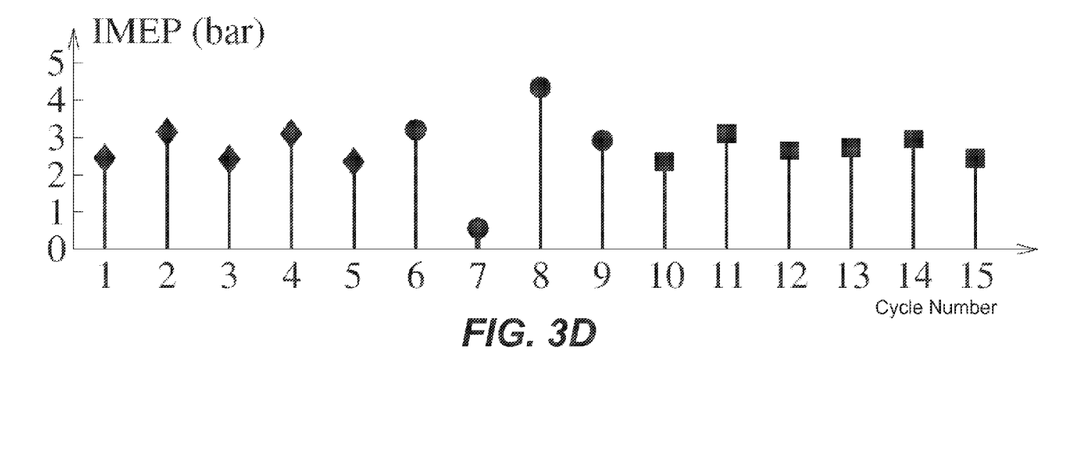
FIG. 3D is a graph illustrating the indicated mean effective pressure of an engine for each of a plurality of combustion cycles during HCCI combustion.

These variations in temperature and the amount of unburned fuel affect subsequent combustion cycles in the engine cylinder. As illustrated in FIG. 3C, the combustion phasing of the engine during HCCI combustion exhibits a moderate oscillation between cycles. During combustion cycle 2, the combustion phasing is earlier than during combustion cycles 1 or 3. However, the misfire in the cylinder during combustion cycle 5 causes a significant advance in the combustion phasing during combustion cycle 6 and a significantly late combustion during cycle 7. Similarly, in FIG. 3D, the indicated mean effective pressure (IMEP) of the engine cylinder will exhibit a slight oscillation during normal HCCI combustion. However, the engine misfire during combustion cycle 5 causes a significant pressure drop that is observed during combustion cycle 7.

Effective operation of an internal combustion engine requires consistent performance and minimal engine misfires. As such, an engine could be configured to reduce the operating range in which HCCI combustion is applied. As such, HCCI combustion is only applied under operating conditions where high cycle-to-cycle combustion variation is unlikely. However, reducing the operating ranges eliminates some of the benefits of operating in HCCI.

Figure 4:
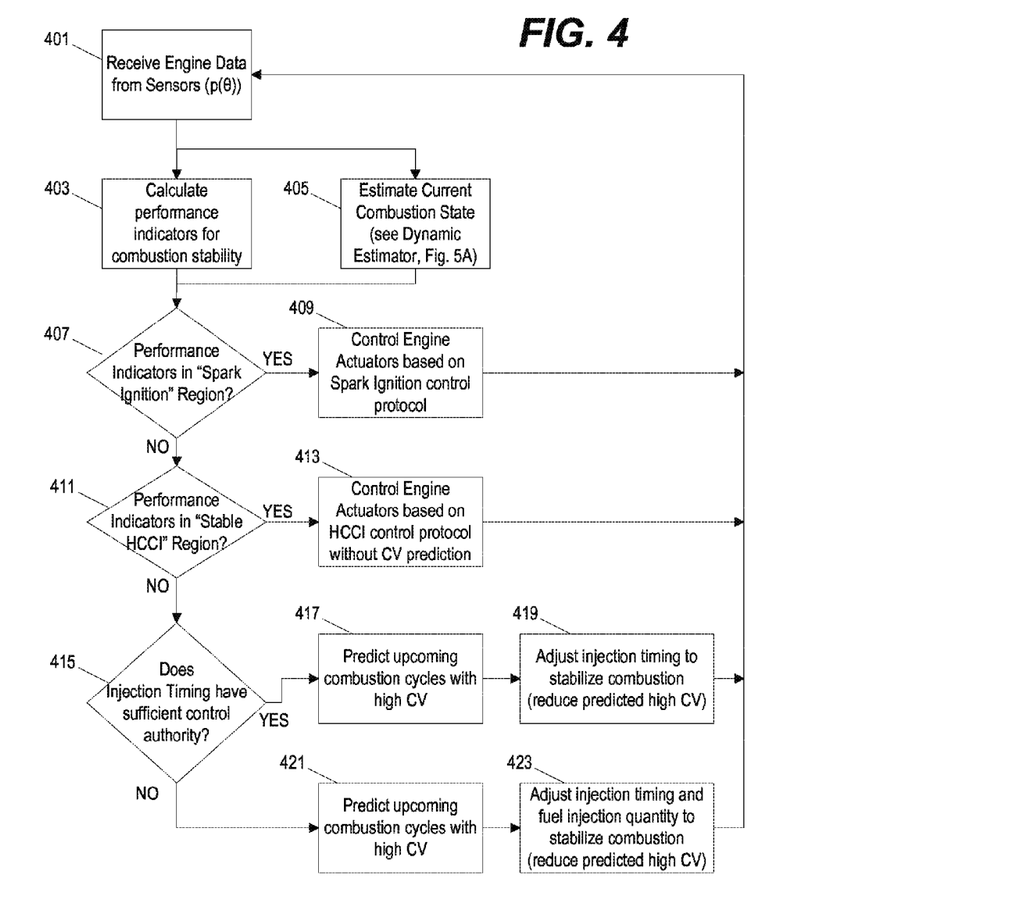
FIG. 4 is a flowchart of a method for predicting high cycle-to-cycle combustion variation and applying preventative measures to prevent the predicted high cycle-to-cycle combustion variation using the engine control system of FIG. 1.

FIG. 4 illustrates a method of predicting high cycle-to-cycle combustion variation and applying corrective measures to prevent misfire conditions from occurring. The engine control unit 101 receives engine data (e.g., pressure measurements) from the various engine sensors (step 401). The engine control unit 101 then calculates performance indicators for combustion stability such as, for example, engine torque and engine speed (step 403). The engine control unit also applies a dynamic estimator to estimate the current combustion states of the engine based on more limited data received from the sensors (step 405). The dynamic estimator is described in further detail below in reference to FIGS. 5A and 5B.

The engine control unit 101 then determines, based on the performance indicators, whether the engine in an operating region where spark ignition should be applied (step 407). If so, the engine control unit 101 controls the engine actuators based on a spark ignition control protocol (step 409). If not, the engine control unit 101 determines whether the engine is operating under conditions where HCCI combustion can be applied without a substantial risk of cycle-to-cycle combustion variation (i.e., a "stable" HCCI region) (step 411). If the performance indicators indicate that HCCI combustion can be applied with low risk of cyclic variability, the engine control unit 101 controls the engine actuators based on an HCCI control protocol without cyclic variability (CV) prediction (Step 413). Examples of fueling and control strategies for operating an internal combustion engine in an HCCI combustion mode are described in further detail in U.S. patent application Ser. Nos. 13/621,433 and 13/621,425, both filed on Sep. 17, 2012, the entire contents of both of which are incorporated herein by reference.

If, however, the engine performance indicators indicate that the engine is currently under operating conditions where spark ignition is not necessary, but cyclic variability is more likely if HCCI combustion is applied, the engine control unit 101 implements a predictive algorithm for detecting and correcting conditions that may cause high cyclic variability. First, the engine control unit 101 determines whether injection timing alone has significant control authority to control combustion variability (step 415). In other words, the engine control unit 101 determines whether the engine conditions such that combustion variability can be prevented simply by adjusting the fuel injection timing. In some cases, this determination is based solely on the engine configuration and hardware (i.e., injection timing either always has sufficient control authority or always lacks sufficient control authority regardless of the operating conditions of the vehicle). In other cases, whether injection timing has sufficient control authority is determined based on the current operating conditions (i.e., the performance indicators) of the engine. In any case, the factors applied to make this determination are engine specific and the engine control unit 101 is calibrated accordingly.

If injection timing does have sufficient control authority to prevent cyclic variability (step 415), the engine control unit 101 applies a predictive model to determine whether high cyclic variability is likely to be exhibited in upcoming combustion cycles based, at least in part, on the current combustion state of the engine (step 417). The predictive model applied by the engine control unit 101 is described in further detail below. Based on the output of the predictive model, the engine control unit 101 adjusts the fuel injection timing for the engine cylinder to stabilize combustion and prevent any predicted high cycle-to-cycle combustion variation (step 419).

Similarly, if the engine conditions are such that injection timing alone does not have sufficient control authority to regulate combustion variation, the engine control unit 101 also applies a predictive model to determine whether high cyclic variability is likely to be exhibited in upcoming cycles (step 421). The engine control unit 101 then adjusts both the fuel injection timing and the fuel injection quantity to stabilize combustion and reduce any predicted high cycle-to-cycle combustion variation (step 420). In some constructions, the predictive model applied at step 421 is the same as the predictive model applied at step 417. However, in some constructions, the model applied may be different in order to provide more specific information which can be used by the engine control unit 101 to stabilize combustion by adjusting both fuel injection timing and fuel injection quantity.

The predictive model captures the recycling of the thermal and chemical energy in the residual gas of the cylinder, and the effect of injection timing on the combustion phasing. Three states are utilized, which are defined at the beginning of the combustion cycle k. These are the temperature at intake valve closing $T_{ivc}(k)$, the fuel amount $m_f(k)$, and the ignition scaling A. The model takes into account that combustion efficiency varies with combustion phasing and that heat release can occur during both closed portions of the cycle.

The inputs to the model are the residual gas fraction $x_r(k)$, the injected fuel mass $m_i(k)$, and the crank angle of the injection $u(k)$. The residual gas fraction $x_r$ is mainly regulated by controlling the negative valve overlap (nvo) (i.e., the valve timing). With cam phasing mechanisms, this control is on a considerably slower time scale than that of an engine combustion cycle. The injected fuel amount $m_i$ is typically used to track the desired load from the driver. Control of $x_r$ and $m_i$ is thus limited by slow actuation and the requirement of tracking the desired load. Therefore, the input $x_r(k)$ is treated as an exogenous signal and the injection timing u is selected as the main actuator. However, manipulating $m_i$ on a per-cycle basis is possible and is beneficial if the authority of u is exhausted (e.g., steps 421 and 423 of FIG. 4).

The states, inputs, and outputs for the predictive model described below are illustrated in FIG. 1. Table 1 defines the symbols used for intermediate variables and the definitions for all the parameters of the model.

TABLE 1

| Symbol | Description |
| --- | --- |
| evo, evc | Exhaust valve opening/closing |
| ivo, ivc | Intake valve opening/closing |
| nvo | Negative valve overlap (evc-ivo) |
| $\eta_m$ | Combustion efficiency for the main period (ivc-evo) |
| $\theta$ | Crank angle |
| $\theta_x$ | Crank angle for valve event x (ivo, ivc, evo, or evc) |
| $\theta_{soc}$ | Crank angle for start of combustion |
| $\theta_m$ | Crank angle for end of combustion |
| $\Delta\theta$ | Burn duration |
| $\kappa$ | Knock-integral |
| $\tau$ | Ignition delay |
| k | Combustion cycle index |
| p | In-cylinder pressure |
| T | In-cylinder gas temperature |
| $T_r$ | Residual gas temperature, $T(\theta_{ivo})$ |
| V | Cylinder volume |

Table 2 provides the model parameters divided into five groups: (1) quantities known by design or measurement, (2) ignition delay and burn duration characteristics, (3) lump parameters for the temperature dynamics, (4) efficiency parameters, and (5) injection timing parameters.

TABLE 2

| Symbol | Parameter |
| --- | --- |
| $\omega$ | Engine speed |
| ivc | Intake valve closing |
| $p_{ivc}$ | Pressure at ivc |
| $T_{im}$ | Intake temperature |
| $r_c$ | Compression ratio |
| b | Bore |
| a | Crank radius |
| l | Connecting rod length |
| B | Ignition delay temperature factor |
| n | Ignition delay pressure exponent |
| $d_0$ | Burn duration scaling |
| $d_1$ | Burn duration shift |
| $d_2$ | Burn duration slope |
| $\alpha$ | Breathing parameter |
| $\beta$ | Temperature rise factor, main comb. |
| $\gamma$ | Polytropic exponent |

TABLE 2-continued

| Symbol | Parameter |
|---|---|
| $\zeta$ | Temperature rise factor, nvo comb. |
| $e_1$ | Scaling, main comb. efficiency |
| $e_2$ | Shift, main comb. efficiency |
| $e_3$ | Slope, main comb. efficiency |
| $\eta_n$ | Efficiency for nvo comb. |
| $s_0$ | Injection offset parameter |
| $s_1$ | Injection scaling parameter |
| $s_2$ | Injection slope parameter |

The structure of the complete model is given by the following equations:

$$\begin{cases} T_{ivc}(k+1) = f_1(x(k), x_r(k)) \\ m_f(k+1) = f_2(x(k), x_r(k), m_i(k)) \\ A(k+1) = f_3(u(k)) \end{cases} \quad (1)$$

wherein $x(k) = (T_{ivc}(k), m_f(k), A(k))$ is a state vector.

The temperature dynamics $f_1$ are defined as $$T_{ivc}(k+1) = (1 - x_r(k))T_{im} + x_r(k)T_r(k) \quad (2)$$

where the gas temperature at intake valve opening $T_r(k)$ is $$T_r(k) = \left\{ \alpha[1 + \beta\eta_m(\theta_m)m_f(k)V(\theta_m)^{\gamma-1}]^{\frac{1}{\gamma}} + \zeta m_f(k)(1 - \eta_m(\theta_m)) \right\} T_{ivc}(k) \quad (3)$$

where ($\alpha$, $\beta$, $\zeta$) are lumped parameters and the volume is given later in Eq. (10). The combustion efficiency $\eta_m(\theta_m)$ is modeled by $$\eta_m(\theta_m) = e_1 \left(1 + \exp\frac{\theta_m - e_2}{e_3}\right)^{-1}, \quad (4)$$

with parameters ($e_1$, $e_2$, $e_3$). The end of main combustion is defined by the ignition model of Eq. (8)-(12) given below.

The fuel dynamics $f_2$ are given by $$m_f(k+1) = m_i(k) + x_r(k)(1 - \eta_m(\theta_m))(1 - \eta_n)m_f(k) \quad (5)$$

where $\eta_n$ is the combustion efficiency during nvo, which is assumed constant. The influence of the injection timing $u(k)$ on the ignition in the following combustion cycle is modeled by the following relationship between $u(k)$ and the pre-exponential factor A, $$A(k+1)s_0 + s_1\left(1 + \exp\frac{u(k)}{s_2}\right)^{-1} \quad (6)$$

with the parameters ($s_0$, $s_1$, $s_2$) and where the injection timing $u(k)$ is given in crank angle degrees.

The output from the model is the combustion phasing, the 50% burn angle denoted by $\theta_{50}$, and is approximated to occur after half the burn duration $\Delta\theta$, $$\theta_{50}(k) = \theta_{soc} + \Delta\theta/2 \quad (7)$$

The crank angle timing of the main combustion $\theta_m$ is given by an Arrhenius expression whereas the timing for the combustion during re-compression is constant. The ignition delay for the main combustion is given by $$\tau = A(u)p(\theta)^n \exp(B/T(\theta)) \quad (8)$$

where A(u) is the state capturing the effect of injection timing u, and (B, n) are constant tuning parameters. The pressure $p(\theta)$ and the temperature $T(\theta)$ are given by polytropic processes, $$p(\theta) = p_{ivc}\left(\frac{V(\theta_{ivc})}{V(\theta)}\right)^\gamma \quad (9a)$$

$$T(\theta) = T_{ivc}\left(\frac{V(\theta_{ivc})}{V(\theta)}\right)^{\gamma-1} \quad (9b)$$

where $V(\theta)$ is the cylinder volume, $p_{ivc}$ is the cylinder pressure at intake valve closing (ivc), $\theta_{ivc}$ is the crank angle at intake valve closing, and $\gamma$ is a tuned polytropic exponent. The volume V is given by $$V = \frac{\pi ab^2}{4}\left(1 + l/a + \frac{2}{r_c - 1} - \cos\theta - \sqrt{(l/a)^2 - \sin^2\theta}\right) \quad (10)$$

The start of combustion $\theta_{soc}$ is modeled by a "knock-integral" approach and given by $\theta_{soc} = k^{-1}$ where $$\kappa(\theta_{soc}, A) = \int_{\theta_{ivc}}^{\theta_{soc}} \frac{dl}{\tau}, \, dl = d\theta/\omega \quad (11)$$

and $\omega$ is the engine speed. The end of main combustion $\theta_m$ is given by $$\theta_m = \theta_{soc} + \Delta\theta, \, \Delta\theta = d_0 \exp\frac{\theta_{soc} - d_1}{d_2} \quad (12)$$

where $\Delta\theta$ is the burn duration and ($d_0$, $d_1$, $d_2$) are tuned parameters.

Figure 5A:
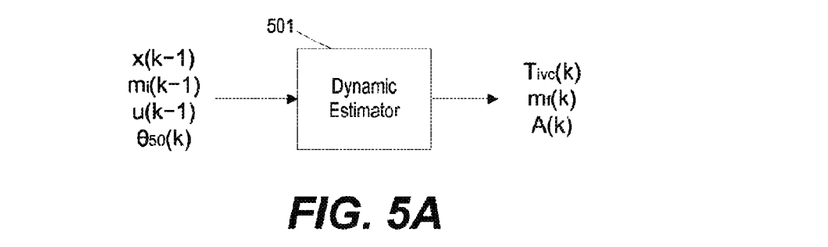
FIG. 5A is a functional block-diagram of a dynamic estimator for use in the method of FIG. 4.

FIG. 5A illustrates the inputs and outputs of the dynamic estimator 501 referred to in FIG. 4. The dynamic estimator receives the state vector x(k−1) indicating the engine state during the immediately prior combustion cycle. The state vector includes the temperature at intake valve closing $T_{ivc}$ and the amount of fuel in the cylinder $m_f$ during the previous combustion cycle. The dynamic estimator also receives the value of the amount of fuel injected during the previous cycle $m_i(k-1)$, the injection timing during the previous cycle $u(k-1)$, and the current combustion phasing $\theta_{50}$ (i.e., the crank angle of the engine at approximately halfway through the burn duration of the combustion cycle). Based on this information, the dynamic estimator is configured to estimate a temperature at intake valve close $T_{ivc}$, a total amount of fuel in the cylinder $m_f$, and an ignition scaling value A for the current combustion cycle.

Figure 5B:
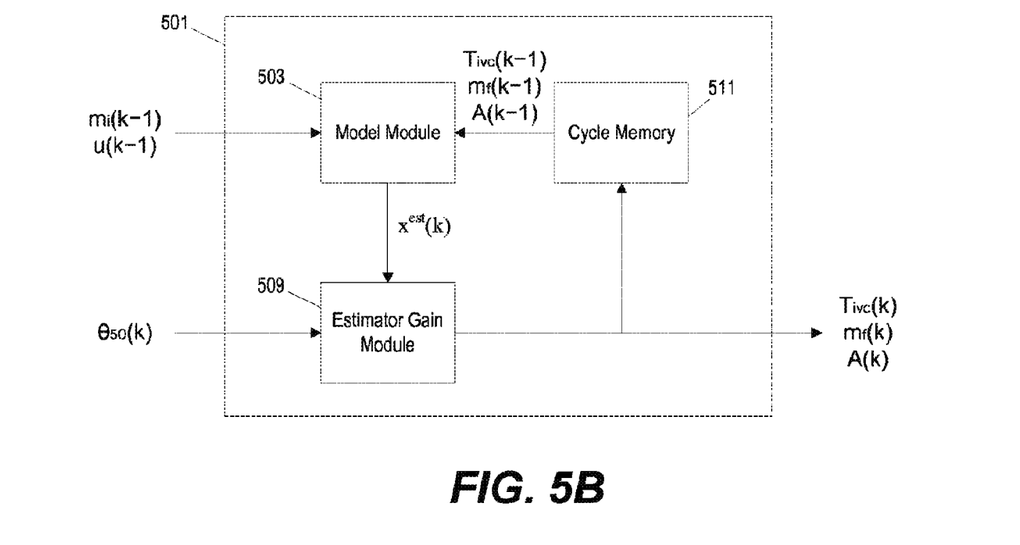
FIG. 5B is a flowchart illustrating the operational details of the dynamic estimator illustrated in FIG. 5A.

FIG. 5B illustrates the functions of the dynamic estimator in further detail. The state vector x(k−1) calculated by the dynamic estimator during the previous combustion cycle are retrieved from memory and applied to a model. The model 503 of the dynamic estimator 501 applies the same equations used in the predictive model described above (Eq. (1)-(7)). However, instead of predicting future combustion behavior based on current combustion states, the dynamic estimator determines current combustion states based on previous combustion behavior. The dynamic estimator processes the modeling equations using the state vector x(k−1) accessed from memory, the fuel amount that was actually injected during the previous combustion cycle $m_f(k-1)$, and the injection timing that was actually applied during the previous combustion cycle $u(k-1)$.

After preliminary estimated values for the current state vector $x(k)$ (including the temperature at intake valve closing $T_{ivc}(k)$, the amount of fuel in the cylinder $m_f(k)$, and the ignition scaling value $A(k)$) are calculated, the dynamic estimator uses an estimator gain module 509 to filter the output of the model module 503 based in part on the combustion phasing $\theta_{50}$ and to calculate the final output values of the current state vector. The output values are calculated by $$x(k)=x^{est}(k)+K(\theta_{50}(k)-h(k)) \tag{13}$$

where $x^{est}(k)$ is the state vector as estimated by the model module 503, and K is an estimator gain parameter. In some constructions, the estimator gain parameter K is a constant value determined by engine calibration. However, in some cases, the value of K is determined based on environmental and engine operating characteristics such as, for example, engine noise. The combustion phasing variable $\theta_{50}$ is measured by sensors on the engine and provided to the estimator gain module 509. The parameter h is an estimated value of the combustion phasing variable as calculated by equation (7) above.

The final output values from the estimator gain module 509 is output from the dynamic estimator 501 and used by other modules of the engine control unit 101, such as, for example, the predictive model described above. The final output values of $x(k)$ are also stored to a memory 511 and used by the dynamic estimator 501 to estimate combustion states during the next combustion cycle $(k+1)$.

Thus, the invention provides, among other things, methods and systems for detecting conditions that may lead to high cycle-to-cycle combustion variation and for applying corrective measures to prevent high cyclic variation. The invention also provides methods and systems for estimating the current combustion states of an internal combustion engine based on fuel injection timing and fuel injection amount as well as the estimated combustion states for the immediately prior combustion cycle. Various features and advantages of the invention are set forth in the following claims.

What is claimed is:

1. A method of controlling a vehicle engine to reduce cycle-to-cycle combustion variation, the method comprising:
    applying a predictive model to predict cycle-to-cycle combustion behaviour of an engine based on observed engine performance variables;
    identifying conditions that indicate high cycle-to-cycle combustion variation based on the predicted cycle-to-cycle combustion behaviour; and
    applying corrective measures to prevent the predicted high cycle-to-cycle combustion variation,
    wherein applying a predictive model to predict cycle-to-cycle combustion behaviour of an engine includes:
        applying a predictive model based on temperature of an engine cylinder and a cylinder charge composition at the end of a combustion cycle.

2. The method of claim 1, wherein the predicted cycle-to-cycle combustion behaviour includes an indicated mean effective pressure.

3. The method of claim 2, wherein the high cycle-to-cycle combustion variation includes an indicated mean effective pressure with a coefficient of variation that is greater than a defined threshold.

4. The method of claim 3, wherein the defined threshold is a coefficient of variation of 5%.

5. The method of claim 1, wherein the predicted cycle-to-cycle combustion behaviour includes a combustion phasing, and wherein the high cycle-to-cycle combustion variation includes a series of combustion phasing values with a standard deviation greater than a defined threshold.

6. The method of claim 1, wherein applying corrective measures to prevent the predicted high cycle-to-cycle variation includes adjusting an amount of fuel injected into the cylinder.

7. The method of claim 6, wherein adjusting the amount of fuel injected includes adjusting the amount of fuel injected for a single cycle based on the predicted cycle-to-cycle combustion behaviour of the engine.

8. The method of claim 6, wherein adjusting the amount of fuel injected includes adjusting the amount of fuel injected in every cycle based on the predicted cycle-to-cycle combustion behaviour of the engine.

9. The method of claim 1, wherein applying corrective measures to prevent the predicted high cycle-to-cycle variation includes adjusting a fuel injection timing for the cylinder.

10. The method of claim 1, wherein the cylinder charge composition includes an amount of unburned fuel at the end of a combustion cycle.

11. The method of claim 10, further comprising:
    estimating the amount of unburned fuel remaining in the cylinder based on one or more measured pressure values of the cylinder during the combustion cycle.

12. The method of claim 1, further comprising:
    estimating the temperature of the engine cylinder based on one or more measured pressure values of the cylinder during the combustion cycle.

13. A method of controlling a vehicle engine to reduce cycle-to-cycle combustion variation, the method comprising:
    applying a predictive model to predict cycle-to-cycle combustion behaviour of an engine based on observed engine performance variables;
    identifying conditions that indicate high cycle-to-cycle combustion variation based on the predicted cycle-to-cycle combustion behaviour; and
    applying corrective measures to prevent the predicted high cycle-to-cycle combustion variation,
    determining a set of one or more engine operating conditions;
    comparing the set of one or more engine operating conditions to a set of defined operating regions;
    operating the engine in a spark ignition mode when the set of one or more engine operating conditions is within a first defined operating region; and
    operating the engine in a homogenous charge compression ignition mode when the set of one or more engine operating conditions is within a second defined operating region,
        wherein the acts of applying the predictive model, identifying conditions that indication high cycle-to-cycle combustion variation, and applying corrective measures are performed when transitioning from the spark ignition mode to the homogenous charge compression ignition mode.

14. The method of claim 13, wherein the homogenous charge compression ignition mode includes a spark-assisted homogenous charge compression ignition mode.

15. The method of claim 13, wherein the acts of applying the predictive model, identifying conditions that indication high cycle-to-cycle combustion variation, and applying corrective measures are performed when transitioning from the homogenous charge compression ignition mode to the spark ignition mode.

16. The method of claim 1, further comprising:
   determining a set of one or more engine operating conditions;
   comparing the set of one or more engine operating conditions to a set of defined operating regions;
   determining that the engine is operating in a stable HCCI region when the set of one or more operating conditions is within a first defined operating region, wherein the engine is unlikely to exhibit high cycle-to-cycle combustion variation in the stable HCCI region; and
   determining that the engine is operating in an unstable HCCI region when the set of one or more operating conditions is within a second defined operating region, wherein the engine is more likely to exhibit high cycle-to-cycle combustion variation in the unstable HCCI region as compared to the stable HCCI region,
   wherein the acts of applying the predictive model, identifying conditions that indication high cycle-to-cycle combustion variation, and applying corrective measures are performed when the engine is operating in the unstable HCCI region.

17. The method of claim 1, wherein applying the predictive model to predict cycle-to-cycle combustion behaviour of the engine includes predicting a residual gas temperature based on the following equation:

$$T_r(k) = \left\{ \alpha[1 + \beta \eta_m(\theta_m) m_f(k) V(\theta_m)^{\gamma-1}]^{\frac{1}{\gamma}} + \zeta m_f(k)(1 - \eta_m(\theta_m)) \right\} T_{ivc}(k)$$

wherein α, β, and γ are parameters defined through engine calibration,
wherein $\theta_m$ is the crank angle at the end of combustion,
wherein $m_f(k)$ is the mass of fuel in the cylinder during combustion cycle k,
wherein $n_m(\theta_m)$ is a combustion efficiency of the engine,
wherein V is the volume of the engine cylinder, and
wherein $T_{ivc}(k)$ is the temperature at intake valve closing.

18. A method of controlling a vehicle engine to reduce cycle-to-cycle combustion variation, the method comprising:
   determining a set of one or more engine operating conditions;
   comparing the set of one or more engine operating conditions to a set of defined operating regions;
   operating the engine in a spark ignition mode when the set of one or more engine operating conditions is within a first defined operating region;
   operating the engine in a homogenous charge compression ignition mode when the set of one or more engine operating conditions is within a second defined operating region; and
   when transitioning from the spark ignition mode to the homogeneous charge compression ignition mode,
      applying a predictive model to predict at least one of a combustion phasing and a mean effective pressure value of an engine cylinder for each of a plurality of future combustion cycles based, at least in part, on a determined cylinder temperature and a determined amount of unburned fuel remaining in a cylinder after a current combustion cycle is complete,
      identifying variations in the at least one of the combustion phasing and the predicted mean effective pressure values for the cylinder which indicate high cycle-to-cycle combustion variation, and
      adjusting at least one of an injected fuel quantity and a fuel injection timing for a subsequent combustion cycle to prevent the predicted high cycle-to-cycle combustion variation.

19. A method of controlling a vehicle engine to reduce cycle-to-cycle combustion variation, the method comprising:
   determining a set of one or more engine operating conditions;
   comparing the set of one or more engine operating conditions to a set of defined operating regions;
   determining that the engine is operating in a stable HCCI region when the set of one or more operating conditions is within a first defined operating region, wherein the engine is unlikely to exhibit high cycle-to-cycle combustion variation in the stable HCCI region;
   determining that the engine is operating in an unstable HCCI region when the set of one or more operating conditions is within a second defined operating region, wherein the engine is more likely to exhibit high cycle-to-cycle combustion variation in the unstable HCCI region as compared to the stable HCCI region; and
   when it is determined that the engine is operating in the unstable HCCI region,
      applying a predictive model to predict at least one of a combustion phasing and a mean effective pressure value of an engine cylinder for each of a plurality of future combustion cycles based, at least in part, on a determined cylinder temperature and a determined amount of unburned fuel remaining in a cylinder after a current combustion cycle is complete,
      identifying variations in the at least one of the combustion phasing and the predicted mean effective pressure values for the cylinder which indicate high cycle-to-cycle combustion variation, and
      adjusting at least one of an injected fuel quantity and a fuel injection timing for a subsequent combustion cycle to prevent the predicted high cycle-to-cycle combustion variation.

* * * * *